June 15, 1926.
R. A. MATHEWS
KEY SHIFTING DEVICE FOR TYPEWRITERS
Filed Dec. 22, 1924
1,589,193
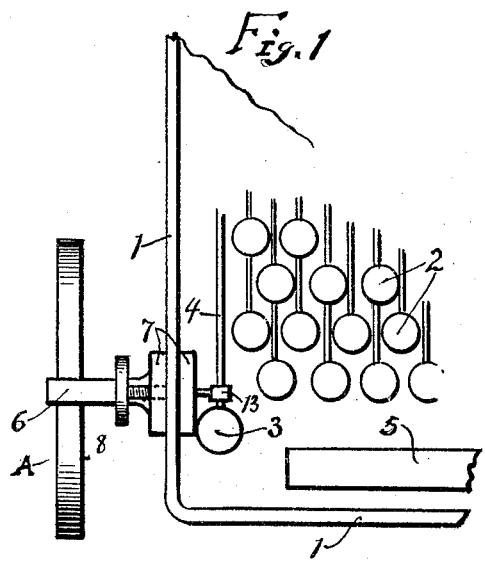
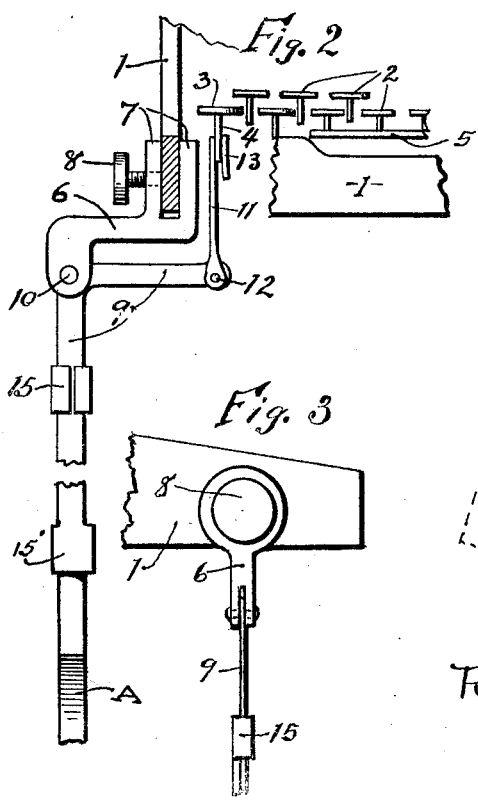
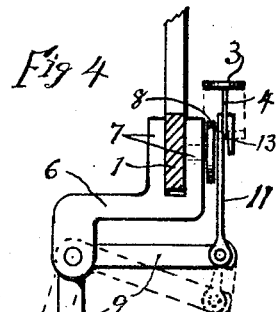
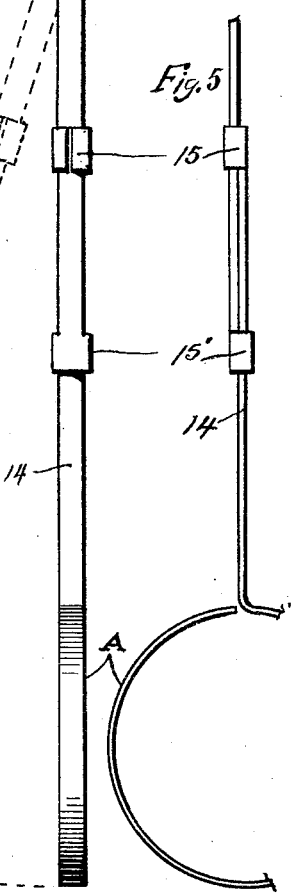
INVENTOR
ROSE A. MATHEWS
BY
U. G. Charles
ATTORNEY Patented June 15, 1926.

1,589,193

UNITED STATES PATENT OFFICE.

ROSE A. MATHEWS, OF TOPEKA, KANSAS.

KEY-SHIFTING DEVICE FOR TYPEWRITERS.

Application filed December 22, 1924. Serial No. 757,417.

My invention relates to a key shifting device for typewriters.

The object of my invention is to provide a simple means for operating the shifting bar. A further object of my invention is to operate the shifting bar otherwise than by the fingers.

A still further object of my invention is to provide a simple means for operating the shifting levers, so that the operator may have greater speed and uniformity of the stroke of the keys.

Referring to the drawings, Fig. 1 is a top view of a fragmentary part of a typewriter and my device attached.

Fig. 2 is a front view of Fig. 1.

Fig. 3 is a side view of the device, and a portion of the typewriter frame.

Fig. 4 is a front view of the device showing the sweep of the pendant by dotted lines.

Fig. 5 is an edge view showing the ring and extension means.

1 represents the frame of a typewriter, 2 the keys, 3 the shift key, 4 the bar for the shift key, 5 is the spacing bar, 6 is a bracket having jaws, 7, said jaws being adapted to receive the frame 11 of the typewriter and fastened firmly thereto by set screw 8. The set screw may be applied to either side of the jaws. On the opposite end of said bracket is a member having a slot therein to receive a bell crank 9, said crank being pivoted by a pin 10. 11 is a connecting link, being pivotally connected to said bell crank as at 12, and on the opposite end of said link is a hook 13, adapted to engage on the bar 4. The pendant portion of the bell crank has a sliding member 14, with a ring A on the lower end thereof, said ring functioning as a bearing engaging with the knee, as it is thrown outward as shown by dotted lines B. Said member 14 is slidably mounted on the bell crank, the ends of each having a clip as at 15 and 15', the said clips tensioning sufficient so that the pendant portion of the bell crank may be adjusted as to length and remain concentrically engaging with the knees of the operator.

It will be understood that by the use of my invention herein set forth, greater speed and uniformity of stroke on the keys may be had as the fingers are free to operate, and the device being an attachment does not require any preparation of the typewriter to receive it, neither is it unsightly in its operative position.

I do not confine my invention to operate the shift key alone as set forth in the drawings, as it may be made to operate the tabulating or other keys for special work. It will also be understood that it may be applied to any of the standard makes of typewriters, and may be attached and operated from either side and in such event, the only modification required will be varying the length of the horizontally disposed portion of the bell crank.

Such modifications may be employed as lie within the scope of the appended claim, and what I claim as new and desire to secure by Letters Patent is:

In combination with a typewriter, a bracket positioned on the side frame of said typewriter, the said bracket having jaws passing over the frame from the lower side and firmly fastened with one screw, the leg of said bracket extending outward and being split to receive a bell crank; a bell crank, the pendant portion of which is adjustable longitudinally, said adjustment held by friction clips, a ring on the end of said pendant portion, a link pivotally connected on the opposite end of said bell crank, said link having a hook engaging the shifting bar of the typewriter, said hook being of sufficient length so that the shifting bar may be manipulated by its respective key, independent of said link.

ROSE A. MATHEWS.